Patented Sept. 2, 1941

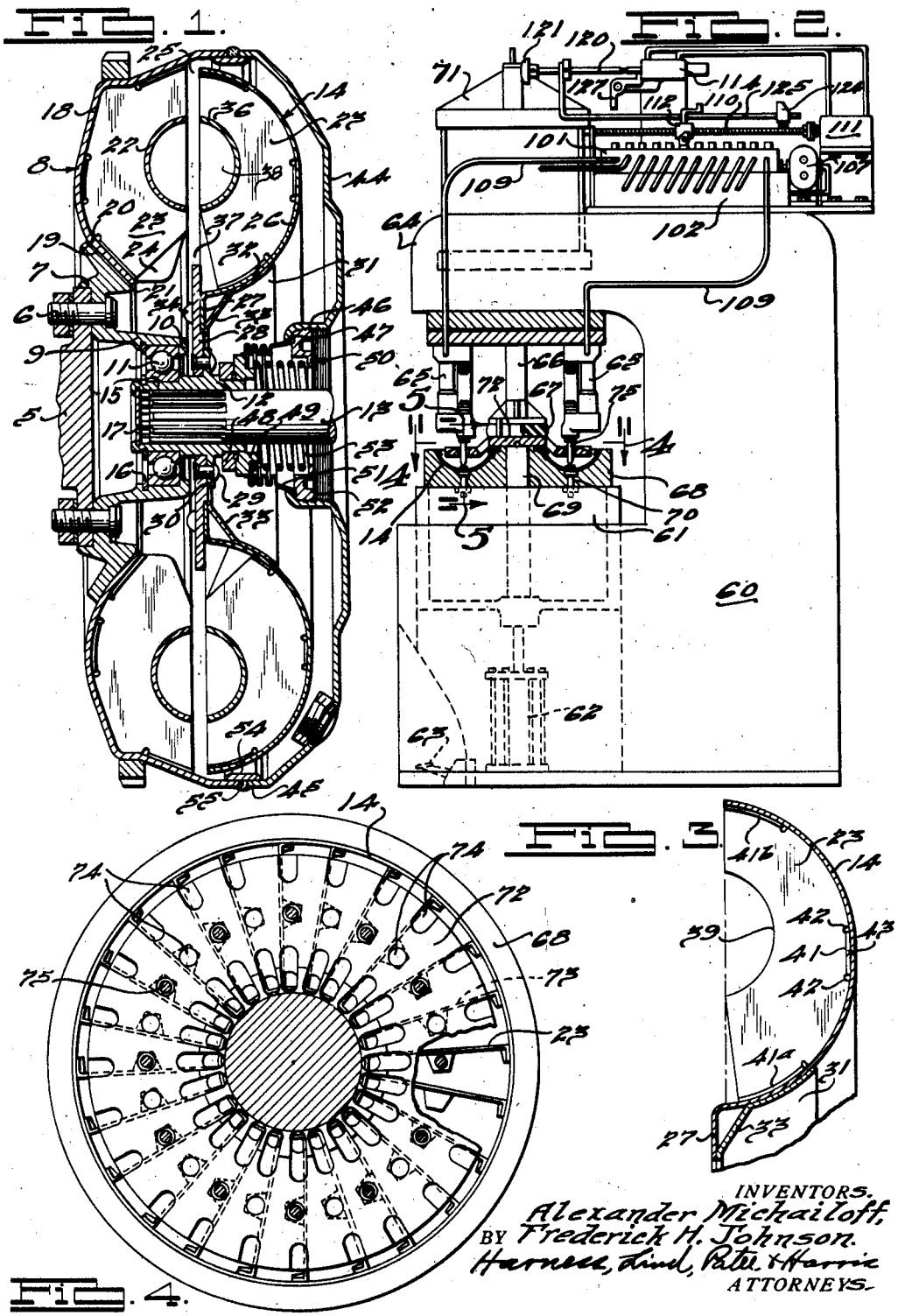

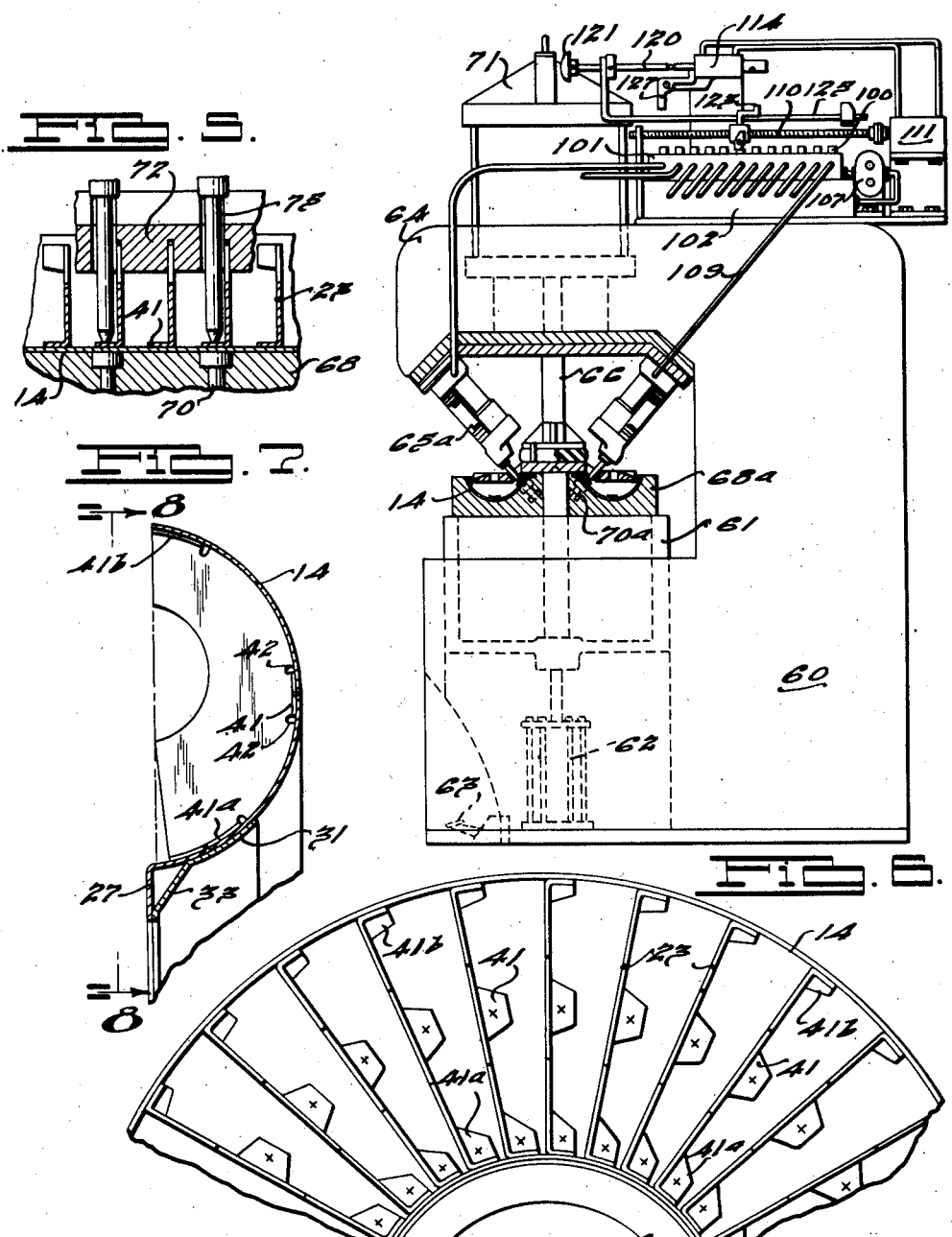

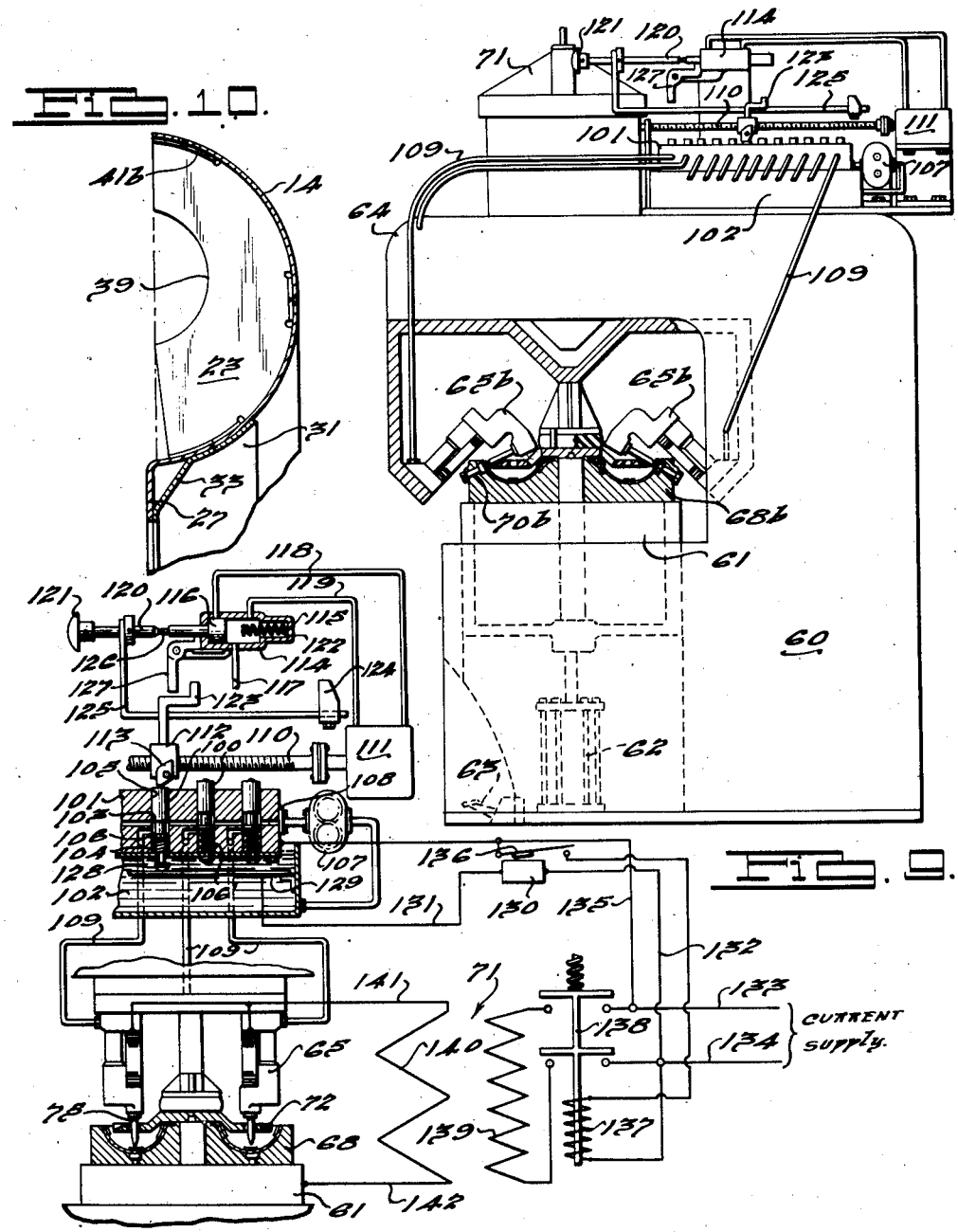

2,254,303

UNITED STATES PATENT OFFICE 2,254,303

APPARATUS FOR FLUID COUPLING WELDING

Alexander Michailoff, Grosse Pointe Farms, and Frederick H. Johnson, Ferndale, Mich., assignors to Chrysler Corporation, Highland Park, Mich., a corporation of Delaware Application May 11, 1939, Serial No. 273,106

2 Claims. (Cl. 219—4)

This invention relates to an apparatus useful in manufacturing fluid couplings.

It pertains specifically to apparatus for facilitating the welding of the passage forming vanes of fluid couplings to the impeller and runner housings thereof.

The advantages inherent in the use of a fluid coupling for connecting the output shaft of a prime mover to a shaft to be driven have been known for many years. Such couplings, however, have not come into general use, chiefly because of their high cost and relatively great weight.

It is the principal object of the present invention to provide an apparatus for fabricating fluid couplings which is adapted to be used for large quantity production.

Another object of the invention is to provide an improved welding apparatus for fabricating fluid couplings whereby a strong and relatively light weight unit may be produced at low cost.

An illustrative embodiment of the invention is now about to be described in conjunction with the accompanying drawings, in which:

Fig. 1 is a central vertical sectional view of a fluid coupling fabricated by the method and apparatus described and claimed herein.

Fig. 2 is a partial sectional view of a welding machine showing the positions of the electrodes during the first welding operation on a fluid coupling runner.

Fig. 3 is a sectional view of a part of a fluid coupling runner showing the first weld.

Fig. 4 is a view along the line 4—4 of Fig. 2.

Fig. 5 is a view along the line 5—5 of Fig. 2.

Fig. 6 is a view similar to Fig. 2 but showing the positions of the electrodes during the second welding operation.

Fig. 7 is a view similar to Fig. 3 but showing the second weld.

Fig. 8 is a view along line 8—8 of Fig. 7.

Fig. 9 is a view similar to Figs. 2 and 6 but showing the positions of the electrodes during the third welding operation.

Fig. 10 is a view similar to Figs. 3 and 7 but showing the third weld.

Fig. 11 is a diagrammatic view of the electrical and hydraulic connections to the welding apparatus.

Referring to the drawings, the reference character 5 designates a power driving shaft such as the crankshaft of a prime mover (not shown), to which is secured by bolts 6 an annular mounting hub 7 for the impeller structure generally designated at 8. The hub 7 has an annular axially extending sleeve portion 9 terminating in an annular radially inwardly extending flange 10. A bearing structure 11 is positioned radially intermediate the inner face of sleeve 9 and a hub 12 splined on a driven shaft 13, the hub 12 serving to mount the runner structure, generally designated by the numeral 14, of the coupling. The bearing 11 is maintained against axial displacement in one direction by the flange 10 of hub 7 cooperating with a shoulder 15 on the hub 12, and against axial displacement in the opposite direction by a washer 16 having its peripheral edge portion seated in a groove formed in the adjacent face of sleeve 9 and hub 12. The open end of hub 12 is closed by a disk 17 which prevents escapement of the fluid operating medium for the coupling axially between hub 12 and shaft 13.

The impeller structure 8 includes an annular dished element 18 preferably comprising sheet metal, the radially inner free end portion of which conforms generally to the contour of the mounting face 19 of the radially extending portion of hub 7, and is suitably secured to the mounting face by welding, as indicated at 20 and 21. The hub mounting face 19 and adjacent free end portion of the runner element are spaced radially outwardly from the hub sleeve 9, this arrangement providing a pocket for the fluid operating medium as will more fully appear hereafter.

The impeller structure further includes an inwardly disposed annular dished element 22 preferably comprising sheet metal, the gauge of which is substantially less than that of the element 18. A plurality of circumferentially spaced vanes 23 extend generally radially with respect to the axis of the rotation of the coupling and are disposed between the elements 18 and 22, the spaces between adjacent vanes providing passages for a suitable fluid operating medium, such as oil, entering at 24 and curving outwardly around the inner element 22 for a discharge at 25.

The fluid operating medium discharged at 25 passes to the runner structure 14 which includes the annular dished runner element 26 preferably comprising sheet metal. The inner free end portion of the element 26 is deflected to provide the radial flange 27 which abuts an annular centrally apertured disk 28 secured by rivets 29 to an annular radially extending flange 30 of hub 12 splined on the driven shaft 13.

An annular reinforcing member indicated at 31 is provided for the runner element 26, this member having a dish-shaped portion 32 conforming to the contour of the adjacent portion of the element 26 and suitably secured thereto as by welding. The reinforcing member 31 also includes an annular radially inwardly extending flange 33 abutting the flange 27 of the element 26. A plurality of circumferentially spaced rivets 34 engage the flanges 33, 27 and disk 28 for drivingly securing the runner to the driven shaft 13.

The runner structure further includes the inner annular dished element 36 preferably comprising sheet metal, and a plurality of circumferentially spaced vane members, as shown at 23 in Fig. 3, extending between the elements 26 and 36 to provide the passages corresponding to the passages similarly formed in the impeller structure for receiving the fluid working medium discharged at 25 from the latter structures, the fluid medium circulating around inner runner element 36 for discharge at 37 to the impeller structure. During rotation of the shaft 5, the fluid medium circulates around the annular vortex chamber indicated at 38 and bounded by the inner dished members 22 and 36, the latter providing a channel having open sides for receiving and discharging fluid to the fluid working chamber provided by the space occupied by the vanes 23.

An embodiment of the vane members 23 for the runner structure is shown in Fig. 3, it being understood that the construction thereof and manner of securing the same in assembled position are generally similar for both structures, it being noted that each vane for the impeller structure has an edge portion conforming to the contour of the part 18.

Each vane member 23 preferably comprises a sheet metal stamping having an outer peripheral edge corresponding generally to the contour of the inner periphery of the runner element 25 against which it seats. The intermediate portion of the inner periphery of the vane 23 is cut away to provide a substantially semi-circular seat 39 for the inner runner elements 36.

The outer peripheral edge of the vane member 23 has a plurality of integrally formed, laterally extending securing tabs 41, 41ᵃ and 41ᵇ, one such tab being disposed at each free end portion of the latter peripheral edge and a third tab being located intermediate the free end portions. The vanes 23 are preferably stamped from flat stock and the tabs subsequently deflected to the position shown in Fig. 3. In the stamping operation the outer edge of the metal is provided with relief portions as indicated at 42 to facilitate bending of the tabs to the position shown. Each tab is preferably spot-welded to the runner element 26 as indicated at 43, the weld being formed by the "Hydromatic" process which does not materially affect the strength characteristics of the metal, it being understood that the vane member 23 is of relatively thin gauge metal.

Referring more particularly to Fig. 1, the impeller 8 further includes an annular member 44 surrounding the runner structure. The outer free edge 45 of the member 44 extends generally axially of the extremities thereof and is slightly spaced from the adjacent extremity of the element 18. The inner free edge portion of the member 44 has an axially extending portion 46 provided with a threaded exterior surface and terminates in an annular radially inwardly extending flange 47 spaced from the shaft 13. A ring 48 is press-fitted on a reduced portion of hub 12 for rotation therewith and a second ring 49 is seated in a guideway in the outer peripheral surface of the hub 12 for rotation relative thereto with the impeller structure of the coupling. A sealing unit indicated at 50 is provided for the opening in the member 34 accommodating shaft 13, this unit including a Sylphon bellows portion 51 having one extremity thereof overlapping and suitably secured as by welding to a laterally extending portion of the ring 49. The other extremity of the bellows 51 overlaps the outer face of flange 47 of the member 44 and is held thereagainst by a ring 52 in threaded engagement with the exterior threaded surface of flange 46. A coil spring 53 surrounds shaft 13 and has one end thereof seated against the adjacent face of ring 49 and the other end seated against a radially inwardly extending flange of ring 52, the spring 53 being normally under compression.

The shroud member 44 is secured to the impeller element 18 by welding, as indicated in Fig. 1. In securing these parts together, a ring 54 is positioned interiorly of the coupling in overlapping relationship with the extremities of the parts 18 and 44. The space between the parts 18 and 44 is filled with a suitably welded material which, during the welding operation, fuses with the adjacent surfaces of the parts 54, 18 and 44 to provide a suitable union therebetween as indicated at 55. The ring 54 serves to exclude welding material from the coupling interior during the welding operation and also acts as a stiffener for the coupling structure, thereby permitting the use of lighter gauge material without sacrificing strength and rigidity.

Fig. 2 is a side elevation of the welding machine used to weld the vanes 23 of the runner 14 to the shell thereof, with the fixtures used for retaining the work in place shown in section.

The welding machine comprises generally a base 60, on which is supported a bed 61. The bed 61 is adapted to be reciprocated vertically by a fluid cylinder 62 which is supplied with pressure fluid from a suitable source under the control of a valve operated by a pedal 63. The base 60 has an overhanging portion 64 which carries a battery of welding tools 65 of the well-known type having a fluid cylinder for pressing the welding tip in contact with the work.

In the particular fluid coupling under consideration, the runner is provided with 24 vane members as illustrated in Figs. 4 and 8. As aforesaid, each vane is provided with three tabs 41 for welding to the inner surface of the runner shell. We prefer to provide the welding machine with 12 welding tools thereby making it necessary to index the work only once during the welding of a complete set of tabs.

In Fig. 2, only two welding tools are illustrated. This is done for clarity, it being understood that there are in reality 12 tools 65 spaced equally around the stationary pillar 66 which has a resilient pad 67 fixed to its lower end. The purpose of pad 67 will be presently made apparent.

Fig. 2 illustrates the positions of the various parts, fixtures, tools, etc. during the welding of the central tabs 41 to the shell. A die 68 of copper or other suitable metal is provided on the bed 61 of the machine and has a central bore adapted to receive the upwardly projecting pillar 69. A plurality of replaceable contact buttons 70 (24 in this instance) is provided in the die 68 in alignment with the respective contact tips of the tools 65. Current is supplied to the die 68 and to the tools 65 through connections with the secondary of a transformer 71 positioned on the top of the base 60.

Preparatory to the first welding operation, the runner vane members 23 are assembled in properly spaced relation in the grooves 73 of a fixture 72. The fixture 72 consists of an aluminum ring of such size and shape that it will readily fit inside the runner as shown in Figs. 3 and 4. The radial grooves or slots 73 are milled in the ring 72 and are equally spaced around the underside thereof. A plurality of sets of holes 74, corresponding in number to the number of vanes, is provided through which the reciprocable welding electrodes are adapted to be inserted.

In assembling the vanes preparatory to the first welding operation, the ring 72 is placed on a bench with its grooved side up and a vane is placed in each of the grooves with the tabs 41 upwardly disposed. The runner shell 14 is then placed over the entire assembly which is then turned over and placed in the die 68, as shown in Fig. 2, in such position that the welding electrodes 75 may move downwardly through alternate centrally disposed holes in ring 72 upon operation of the apparatus.

The bed or platen 61 of the welding machine may then be moved upwardly by manipulation of the pedal 63 which controls the fluid cylinder 62, until the resilient pad 67 is slightly compressed by the pressure of the ring 72. The runner assembly is thus rigidly held in place with the various parts and welding elements properly oriented.

The welding tools 65 are suitably controlled by apparatus about to be described in such manner that the vane tabs adapted to be contacted by the electrodes are sequentially welded to the runner shell.

Fig. 11 illustrates in diagrammatic form the various electrical and fluid connections of the welding apparatus. The welding tools 65 may be of any well-known construction of the general type having a fluid cylinder and piston for obtaining the necessary pressure of the electrode on the work. The patent issued to W. H. Martin on August 9, 1938, No. 2,126,490, illustrates a tool of this type.

The flow of fluid to the welding tools is controlled by a plurality of valves 100 provided in the block 101, and said valves are operated in timed sequence to direct the flow of fluid from the supply tank 102 under pressure to the tools 65. Means is also provided for producing a welding current through the respective pairs of electrodes after the pressure fluid has created in each tool the required welding pressure.

Each valve 100 comprises a stem having portions cut therefrom as shown in Fig. 11 to form passageways 103 and 104 within the bores 105 of the block 101. The passageways 103 and 104 are separated by the enlarged portion 106 of the stem which has substantially the full diameter of the bore.

The valve stem is normally positioned to locate the piston part 106 at a point to establish communication between the fluid cylinder of the associated welder and the reservoir 102. The stem is yieldingly held in this position by means of the spring 106'.

A pump 107, suitably driven, is provided to supply fluid drawn from the reservoir to the passageway 108 of the block 101. When any one of the valves is operated as by depression of the stem thereof against the pressure of the spring 106, the pressure fluid from pump 107 flows through pipe 109 into the corresponding cylinder of the welding tool and causes the electrode 75 thereof to immediately engage the tab 41 with the predetermined pressure. Upon the circuit in the primary of the transformer 71 being closed, a current of high amperage passes through the electrodes 70 and 75 and by reason of the contact resistance of the metal of the tab 41 and shell 14, the weld is effected in the manner well known in the art. The transformer circuit is then immediately opened and this is followed by release of the pressure of the fluid and withdrawal of the electrode 75.

The sequential operation of the valves 100 and control of the transformer circuit may be obtained by any suitable means. In the particular form of construction shown in the drawings, a screw 110 operated by a reversible air motor 111 is provided. A traveler 112 threadedly engages the screw and is adapted to be shifted over the bank of valves by rotation of the screw by the motor. The traveler 112 has a cam 113 pivotally mounted thereon for pivotal movement in one direction as indicated in Fig. 11. The cam 113 is mounted on the traveler 112 so as to engage the upper ends of the valve stems and sequentially depress them during movement of the traveler toward the right of Fig. 11. Upon return movement of the traveler, the cam rides over the stems without depressing them.

Movement of the traveler 112 is controlled by the air valve 114 which comprises a shell 115 housing a piston member 116. The shell has an air inlet 117 and outlets 118 and 119. The piston 116 may be operated to close the inlet 117 or to connect the same with either the pipe 118 or pipe 119. A stem 120 is provided for moving the piston inwardly with respect to the shell 115 and a spring 122 located within the shell opposes said movement.

A suitable source of air under pressure, such as a pump, is connected with the inlet 117 and the pipes 118 and 119 are connected to the reversible air motor 111. When the machine operator shifts the piston 116 toward the left of Fig. 11 by pulling on the operating knob 121, air is admitted to pipe 119 and the motor 111 rotates the screw in such direction that the traveler 112 is caused to travel toward the right depressing each valve stem in sequence and admitting fluid to the welders as aforesaid.

As the traveler 112 nears the end of its stroke, the extension 123 thereof engages the lug 124 fixed on the rod 125 carried by the rod 120, and moves the rod 120 toward the right to close off the air inlet 117 and stop the motor. The operator may then reverse the motor preparatory to the next welding cycle by pushing the rod 120 toward the right until the notch 126 thereof engages the spring-pressed latch 127 which holds the rod 120 against the force of spring 122. Air will then enter the motor 111 through pipe 118 and the screw 110 will be rotated in the reverse direction, returning the traveler 112 to starting position, the cam 113 passing over the valve stems without depressing them.

The low end of each stem 100 is provided with a contact 128 which is adapted to contact with the contact bar 129 supported in the reservoir 102 below the surface of the oil. Immersion of the contacts 128 and bar 129 in the oil reduces arcing and burning when contact between the two is broken.

The conductor bar 129 is connected to a time limit relay 130 through the wire 131; wire 132 connecting the other side of the relay to the busbar 134. Wire 135 connects the block 101 to the other busbar 132; thus a circuit will be established through the relay 130 each time a contact is made between the bar 129 and one of the contacts 128. This will occur each time one of the valve stems 100 is depressed whereby the relay will close the switch 136 thereby energizing the coil 137 which in turn electromagnetically operates the double pole switch 138 to close the circuit through the primary 139 of the transformer 71. The secondary 140 is connected to the platen 61 of the welding machine and to each of the tools 65 through wires 141 and 142.

The circuit through the primary 139, however, is not completed by the delayed action of the relay 130 until the welding electrode 75 has been pressed against the work with predetermined welding pressure. The relay 130 is set to release its armature automatically a short interval after the switch 136 has been closed by its operation. The relay is set to perform this opening and closing movement during the period that the cam 113 rides over the ends of the respective stems 100, so that in advance of release of each of the stems by the cam, the circuit of the primary 139 is opened.

By reason of the fact that the welding tools are fluid pressure operated, the operation thereof may be coordinated with that of the relay 130 so that the switch 136 will close as soon as the electrode is pressed against the work, and immediately upon the rise in temperature sufficiently to make the weld. the relay will open the primary circuit. Shortly thereafter giving opportunity for the weld to cool, the electrode is raised. These operations occur in an exceedingly short time and can be readily gauged by adjustment of the relay 130. Consequently, the welds will be produced very rapidly.

After every other one of the centrally disposed tabs 41 of the vanes 23 have been welded to the runner shell by the apparatus just described, the bed or platen 61 is lowered by manipulation of the pedal 63 and the die 68 is indexed around the post 69 a sufficient distance to position the runner and the ring 72 for welding the remaining vanes to the runner. The above described sequence of operations is then carried out and the runner is then removed from the machine and placed in a die 68ª which is placed on the bed 61 of a second machine illustrated in Fig. 6. This machine differs from that shown in Fig. 2 only in that the tools 65ª are mounted at an angle with respect to the post 69 so that the electrodes are adapted to contact the tabs 41ª (Fig. 7). The die 68ª has contact buttons 70ª correctly positioned in juxtaposition relative to the electrodes. The buttons 70ª in this case do not contact the outer surface of the runner shell. but are in contact with the reinforcing 31 as shown in Fig. 6. The welding operation is carried out as aforesaid, every other one of the tabs 41ª being welded to the inner surface of the runner and simultaneously with each weld, a weld is effected between the member 31 and the outer surface of the runner; then the runner is indexed and the cycle is repeated. The aluminum ring 72 may be removed if desired after the tabs 41 have been welded to the runner. However, it is preferred to allow the ring to remain in place during the welding of the tabs 41ª and 41ᵇ to assure correct alignment of the vanes.

After the tabs 41ª and the reinforcing ring 31 have been welded in place, the runner is removed to a third machine, illustrated in Fig. 9, which has a set of welding tools 65ᵇ constructed and arranged in such manner that the tabs 41ᵇ may be welded. To avoid repetition, the third welding operation will not be described, it being understood that it is carried out in a manner similar to that described in connection with Fig. 3.

The vanes of the impeller 18 are welded in place in a manner similar to that described and the torus members 22 and 36 are welded to the vanes by the method described and claimed in the copending application of Alexander Michailoff, Serial No. 244,757, filed December 9, 1938. This copending application also describes and claims the method and apparatus for welding the housing member 44 to the impeller shell 18.

While a specific embodiment of our invention has been described, we wish it to be understood that various changes may be made in our method and apparatus without departing from the spirit or scope of the invention.

What we claim as new and desire to secure by Letters Patent is set forth in the following claims.

We claim:

1. In an apparatus for manufacturing fluid couplings, means for welding a plurality of radially disposed vanes to the inner dished surface of a fluid circulating member comprising a fixture for holding said circulating member in welding position, a fixture for holding said vanes in position for welding to said circulating member, said last fixture having openings for accommodating passage of welding electrodes therethrough, a plurality of electrodes carried by said first fixture and adapted to contact the outer surface of said circulating member at a plurality of circumferentially spaced points, a plurality of reciprocable electrodes respectively disposed in alignment with the aforesaid electrodes and adapted for movement into contact with certain of said vanes, means for sequentially moving said reciprocable electrodes into welding contact with said vanes, said first named fixture being adapted for rotation about the axis of said member whereby said reciprocable electrodes are adapted to contact certain others of said vanes.

2. In an apparatus for manufacturing fluid couplings, means for welding a plurality of radially disposed vanes to the inner dished surface of a fluid circulating member comprising a fixture for holding said circulating member in welding position, a fixture for holding said vanes in position for welding to said circulating member, said last fixture having openings for accommodating passage of welding electrodes therethrough, a plurality of electrodes carried by said first fixture and adapted to contact the outer surface of said circulating member at a plurality of circumferentially spaced points, a plurality of reciprocable electrodes respectively disposed in alignment with the aforesaid electrodes and adapted for movement into contact with certain of said vanes, means for sequentially moving said reciprocable electrodes into welding contact with said vanes, power actuated means for moving said first named fixture to and from welding position, said fixture being adapted for rotation about the axis of said member when in non-welding position whereby said reciprocable electrodes are adapted to contact certain others of said vanes.

ALEXANDER MICHAILOFF.
FREDERICK H. JOHNSON.